US010711799B2

(12) United States Patent
Mariotti et al.

(10) Patent No.: US 10,711,799 B2
(45) Date of Patent: Jul. 14, 2020

(54) PRESSURE EQUALIZER

(71) Applicant: Nuovo Pignone Srl, Florence (IT)

(72) Inventors: Massimiliano Mariotti, Florence (IT);
Claudia Cagnarini, Florence (IT);
Francesco Del Medico, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 220 days.

(21) Appl. No.: 14/399,569

(22) PCT Filed: May 8, 2013

(86) PCT No.: PCT/EP2013/059609
§ 371 (c)(1),
(2) Date: Nov. 7, 2014

(87) PCT Pub. No.: WO2013/167664
PCT Pub. Date: Nov. 14, 2013

(65) Prior Publication Data
US 2015/0093256 A1 Apr. 2, 2015

(30) Foreign Application Priority Data
May 9, 2012 (IT) .............. CO2012A0024

(51) Int. Cl.
F04D 29/58 (2006.01)
H02K 9/197 (2006.01)
(Continued)

(52) U.S. Cl.
CPC ......... F04D 29/5806 (2013.01); F04D 17/12 (2013.01); F04D 25/06 (2013.01);
(Continued)

(58) Field of Classification Search
CPC .. F04D 25/0686; F04D 13/086; F04D 29/588; F04D 13/062; H02K 5/132
(Continued)

(56) References Cited

U.S. PATENT DOCUMENTS 2,291,248 A 7/1942 Myers
2,318,181 A 5/1943 Myers
(Continued)

FOREIGN PATENT DOCUMENTS

CN 101410624 A 4/2009
CN 101675249 A 3/2010
(Continued)

OTHER PUBLICATIONS

Unofficial English Translation of Chinese Office Action issued in connection with corresponding CN Application No. 201380024295.X dated Feb. 3, 2016.
(Continued)

Primary Examiner — Nathan C Zollinger
(74) Attorney, Agent, or Firm — Baker Hughes Patent Organization

(57) ABSTRACT

Systems and methods for maintaining a desired differential pressure between a cooling oil of an electric motor and a process gas working fluid of a compressor connected axially to the electric motor. The cooling oil acts as a coolant for the motor compartment of the electric motor and the gas working fluid acts as a coolant for the rotor compartment of the electric motor. At least one bellow is configured to provide two sealed compartments in a pressure equalizer and a spring means is configured to add a differential pressure to the cooling oil, assuring no leaks between the two fluids flows from the cooling oil to the process gas working fluid
(Continued)

and no contact of the process gas working fluid with the electric motor stator, in particular electric motor laminations and electric motor windings.

10 Claims, 7 Drawing Sheets

(51) Int. Cl.
  *F04D 17/12*    (2006.01)
  *F04D 25/06*    (2006.01)
  *F04D 25/08*    (2006.01)
  *F04D 13/06*    (2006.01)

(52) U.S. Cl.
  CPC ....... *F04D 25/0606* (2013.01); *F04D 29/584* (2013.01); *H02K 9/197* (2013.01); *F04D 13/0626* (2013.01); *F04D 25/082* (2013.01)

(58) Field of Classification Search
  USPC ........................................ 417/367, 368, 372
  See application file for complete search history.

(56) References Cited

U.S. PATENT DOCUMENTS

| | | |
|---|---|---|
| 2,404,783 A | 7/1946 | Blom |
| 2,423,436 A | 7/1947 | Blom |
| 2,545,242 A | 3/1951 | Robinson |
| 2,545,422 A | 3/1951 | Blom |
| 2,682,229 A | 6/1954 | Luenberger |
| 2,739,252 A | 3/1956 | Patterson et al. |
| 2,903,970 A | 9/1959 | Elovitz et al. |
| 2,912,867 A | 11/1959 | Gallant |
| 3,161,413 A | 12/1964 | Audemar |
| 3,164,102 A | 1/1965 | Schmidt |
| 3,241,492 A | 3/1966 | Arutunoff |
| 3,289,595 A | 12/1966 | Bach |
| 3,555,834 A | 1/1971 | Weston, Jr. |
| 3,575,264 A | 4/1971 | Johnson et al. |
| 3,746,472 A | 7/1973 | Rupp |
| 3,755,702 A | 8/1973 | Willyoung |
| 3,892,937 A | 7/1975 | Paton et al. |
| 4,425,087 A | 1/1984 | Gould |
| 4,436,488 A | 3/1984 | Witten |
| 4,460,181 A | 7/1984 | Araoka |
| 4,492,523 A | 1/1985 | Knox |
| 4,583,923 A | 4/1986 | James |
| 4,614,482 A | 9/1986 | Gaffal |
| 4,932,848 A * | 6/1990 | Christensen .......... F04D 13/086 417/368 |
| 4,940,911 A | 7/1990 | Wilson |
| 5,101,128 A | 3/1992 | Veronesi et al. |
| 5,211,532 A | 5/1993 | Thompson |
| 5,636,847 A | 6/1997 | Ostrowski |
| 5,795,135 A | 8/1998 | Nyilas et al. |
| 5,796,197 A | 8/1998 | Bookout |
| 6,059,539 A * | 5/2000 | Nyilas ..................... E21B 43/01 417/228 |
| 6,242,829 B1 | 6/2001 | Scarsdale |
| 6,268,672 B1 | 7/2001 | Straub et al. |
| 6,526,765 B2 * | 3/2003 | Lifson ................... F25B 31/004 62/468 |
| 6,655,932 B1 | 12/2003 | Stinessen et al. |
| 6,981,853 B2 * | 1/2006 | Du ........................ E21B 43/128 310/87 |
| 7,479,716 B2 * | 1/2009 | El-Antably .............. H02K 1/20 180/65.1 |
| 8,113,792 B2 * | 2/2012 | De Boer ................. F04D 25/06 417/228 |
| 8,313,316 B2 | 11/2012 | Bade et al. |
| 8,529,217 B2 * | 9/2013 | Alfes .................... F04D 13/062 417/228 |
| 2003/0042017 A1 | 3/2003 | Traylor |
| 2003/0156947 A1 | 8/2003 | Gross |
| 2005/0008514 A1 | 1/2005 | Merrill et al. |
| 2006/0231265 A1 | 10/2006 | Martin |
| 2008/0121392 A1 | 5/2008 | Chitty et al. |
| 2010/0014990 A1 | 1/2010 | Nijhuis |
| 2010/0290896 A1 * | 11/2010 | Lenderink ............. F04D 17/122 415/169.2 |
| 2010/0303639 A1 | 12/2010 | Alfes et al. |
| 2011/0052432 A1 * | 3/2011 | Cunningham .......... F04D 13/10 417/423.3 |

FOREIGN PATENT DOCUMENTS

| | | | |
|---|---|---|---|
| DE | 807341 C | 6/1951 | |
| DE | 1050434 B | 3/1956 | |
| DE | 1528715 A1 | 7/1969 | |
| EP | 297274 A2 | 1/1989 | |
| EP | 877895 B1 | 4/2003 | |
| EP | 986692 B1 | 1/2006 | |
| EP | 2065555 A1 | 6/2009 | |
| FR | 2602551 A3 | 2/1988 | |
| FR | 2919346 A1 | 1/2009 | |
| GB | 1184650 A * | 3/1970 | ......... F04D 15/0022 |
| NL | 1012940 C2 | 5/2001 | |
| RU | 2209348 C2 | 7/2003 | |
| RU | 2275533 C2 | 4/2006 | |
| WO | 200077341 A1 | 12/2000 | |
| WO | 2008046817 A1 | 4/2008 | |
| WO | 2008154434 A1 | 12/2008 | |

OTHER PUBLICATIONS

Burgmann, "Excellence in Metal Expansion Joints", pp. 1-16, 2001.
Search Report and Written Opinion issued in connection with corresponding IT Application No. CO2012A000024 dated Feb. 18, 2013.
International Search Report and Written Opinion issued in connection with corresponding PCT Application No. PCT/EP2013/059609 dated Sep. 17, 2013.
Unofficial English translation of Office Action and Search Report issued in connection with corresponding RU Application No. 2014143530 dated Aug. 10, 2016.

* cited by examiner

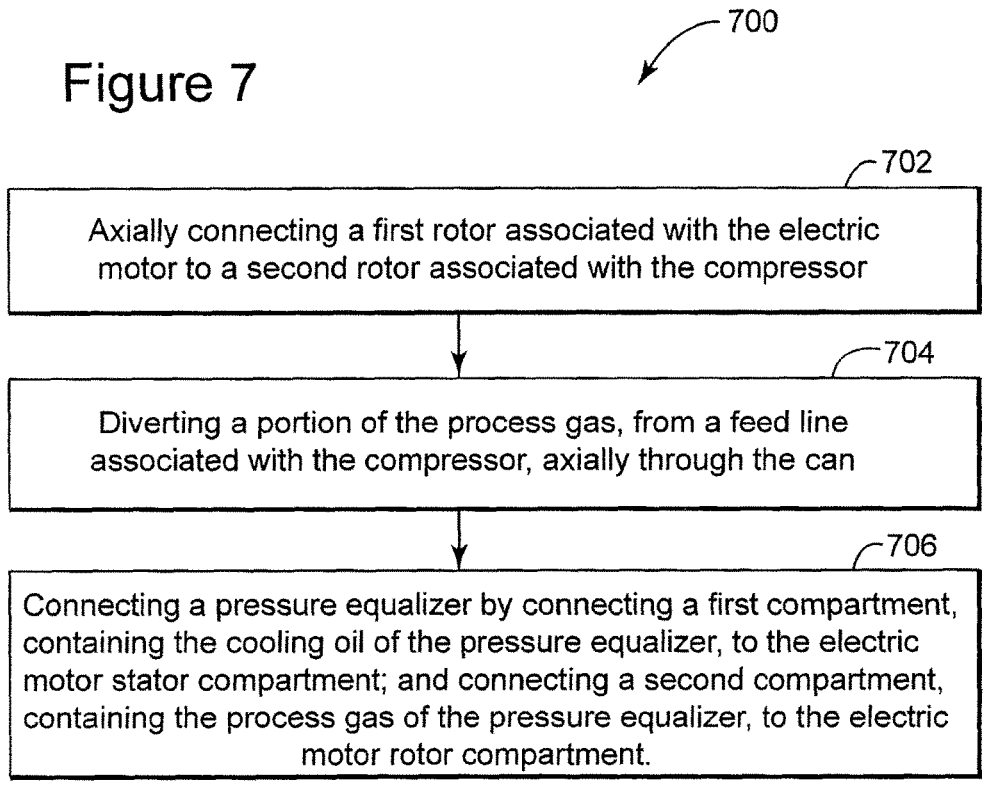

PRESSURE EQUALIZER

TECHNICAL FIELD

Embodiments of the present invention relate generally to maintaining a desired differential pressure between the motor cooling oil and the gaseous working fluid of an integrated motocompressor machine.

BACKGROUND

The use of high speed electric motors to drive compressors is commonplace in many applications; in particular, canned motors are largely employed in wet, sour gas environments. During the operation of the electric canned motor, a large amount of heat generated by the electric device must be addressed to preserve the integrity of the electric canned motor. Cooling of the electric canned motor is provided by cooling oil in the motor stator. A can surrounding the motor stator provides a leak-proof separation of the working fluid and the cooling oil. The can is typically made of a thin material layer and therefore is sensitive to pressure differences between the cooling oil and the working fluid.

Based on the desire to protect the can from failure due to excessive pressure differences between the cooling oil and the gas working fluid, mechanisms have evolved for controlling the differential pressure between the cooling oil and the working fluid. These methods include the use of external vessels, with at least one vessel containing at least one bellow and one spring means for maintaining the differential pressure between the cooling oil and the working fluid thus keeping a higher pressure on the side of the cooling oil to prevent flow of the working fluid into the cooling oil.

Based on the above described electric canned motor/compressor operating conditions, a system and associated methods are desired allowing a system to manage the pressure differential between the cooling oil and the gas working fluid of a motocompressor. The system should allow at least a slightly higher pressure on the cooling oil side of the can thus preventing the gas working fluid from leaking into the cooling oil. The system should compensate for changes in the cooling oil pressure based on thermal expansion of the cooling oil and on changes in gas pressure based on downstream gas utilization.

SUMMARY

Systems and methods according to these exemplary embodiment descriptions address the above described needs by providing a pressure equalizer connected to a motocompressor. The pressure equalizer of the exemplary embodiments has chambers created by at least one bellow inside the pressure equalizer with a first line connecting one chamber to a motor compartment on an electric motor and a second line connecting a second chamber to a rotor compartment on the electric motor. The exemplary embodiments also describe at least one spring associated with the pressure equalizer and configured to provide a desired differential pressure between the gas working fluid pressure and the cooling oil.

According to an exemplary embodiment of an apparatus, an electric motor, having a can separating a process gas, flowing inside the can and external to an electric motor rotor, from cooling oil contained in an electric motor stator compartment outside the can is axially connected to a compressor. Next in the exemplary embodiment, a compressor is provided having a rotor connected to the electric motor rotor, wherein a part of the compressor's process gas is diverted through the can. Further in the exemplary embodiment, a pressure equalizer is provided with at least one bellow hermetically connected to a housing to prevent the mixing of the process gas with the cooling oil and provided with a first reservoir of cooling oil and a second reservoir of process gas inside the housing. Next in the exemplary embodiment, at least one spring is configured to provide compression on the cooling oil such that the cooling oil pressure is greater than the process gas pressure. The exemplary embodiment continues with a connection from the first reservoir to the electric motor stator compartment and a connection from the second reservoir to the process gas inside the can.

According to another exemplary embodiment, a method for maintaining a desired differential pressure between cooling oil associated with a electric motor stator compartment and process gas associated with a compressor, separated by a can integrated into the electric motor, is presented. Continuing with the exemplary embodiment method, a rotor of the electric motor is axially connected to a rotor of the compressor. In the next step of the exemplary embodiment method, a portion of the process gas is diverted from a feed line, associated with the compressor, through the can. Continuing with the exemplary embodiment method, a pressure equalizer is connected to the electric motor by connecting a first compartment of the pressure equalizer containing cooling oil, to the electric motor stator compartment and connecting a second compartment of the pressure equalizer containing the process gas, to the rotor compartment of the electric motor; the pressure in the first compartment is maintained higher than the pressure in the second compartment.

In a further exemplary embodiment, a system for maintaining a desired differential pressure between cooling oil and a process gas, both associated with an electric motor that is axially connected to a compressor, is described. The exemplary embodiment includes a means for separating the cooling oil and the process gas. Continuing with the exemplary embodiment, also included is a means for adding the desired differential pressure between the cooling oil and the process gas in all operating conditions.

BRIEF DESCRIPTION OF THE DRAWINGS

The accompanying drawings illustrate exemplary embodiments, wherein:

FIG. 7 is a flowchart depicting a method for equalizing the pressure differential between a motor compartment of cooling oil and a gas phase working fluid associated with a canned electric motor axially connected to a compressor and a pressure equalizer.

DETAILED DESCRIPTION

The following detailed description of exemplary embodiments refers to the accompanying drawings. The same reference numbers in different drawings identify the same or similar elements. Also, the following detailed description does not limit the invention. Instead, the scope of the invention is defined by the appended claims.

Figure 1:
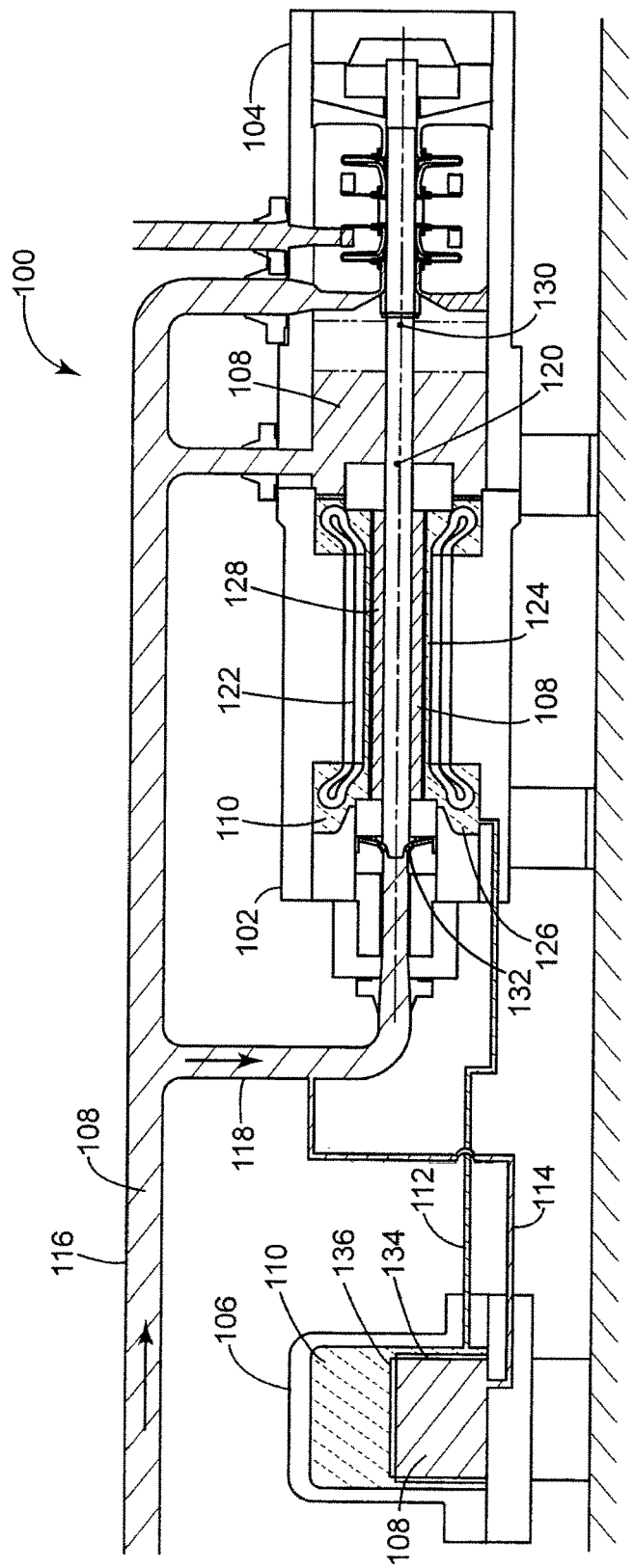
FIG. 1 depicts a canned electric motor axially connected to a compressor and connected to a pressure equalizer.

Looking to FIG. 1, a detailed diagram of an exemplary embodiment of a motocompressor system 100 is presented. The exemplary embodiment includes an electric motor 102, a compressor 104 axially connected to the electric motor and a pressure equalizer 106, also connected to the electric motor 102. It should be noted in this exemplary embodiment that the pressure equalizer 106 is connected to the electric motor 102 by a plurality of connections 112, 114 allowing the flow of at least the gas working fluid 108 and the cooling oil 110 between the electric motor 102 and the pressure equalizer 106. Further, in this exemplary embodiment, it should be noted that a portion of the process gas working fluid 108 is diverted from the compressor feed line 116 through the electric motor feed line 118 then returning to the compressor feed line 116 before entering the compressor 104. The diverted process gas working fluid 108 passes through the electric motor 102, acting as a cooling fluid for the electric motor 102's rotor 120, rotor 120's bearings and stator 122.

Next in the exemplary embodiment, the electric motor 102 uses a can 124 to separate a motor oil compartment 126, containing at least a stator 122 and cooling oil 110, from a rotor compartment 128, containing at least the electric motor 102 rotor 120, rotor 120 bearings and the diverted process gas working fluid 108. It should be noted in the exemplary embodiment that the can 124 can be manufactured from any material, suitable for use in an electric motor 102. The exemplary embodiment further illustrates an impeller 132 connected to the electric motor 102 rotor 120 at the diverted process gas working fluid 108 entry end of the can 124 for increasing the pressure of the diverted process gas working fluid 108 to ensure flow through the rotor compartment 128. Impeller 132 can act as a cooling device configured to cool the electric motor rotor. Further in the exemplary embodiment, the electric motor 102 has a plurality of connections for allowing the cooling oil 110 and the gas working fluid 108 to flow along independent paths shown as connections 112, 114 between the electric motor 102 and the pressure equalizer 106.

Continuing with the exemplary embodiment, a compressor 104 is attached to the electric motor 102 by axially connecting the electric motor 102 rotor 120 to the compressor 104 rotor 130. In the exemplary embodiment, the compressor is fed a process gas working fluid 108 from the compressor feed line 116. It should be noted that one skilled in the art will recognize the compressor 104 used in this example as a typical axial-driven centrifugal compressor.

In another aspect of this exemplary embodiment, a pressure equalizer 106 is connected to the electric motor 102 by the two lines 112, 114 described previously as connecting to the motor oil compartment 126 for flow of the cooling oil 110 and connecting to the rotor compartment 128 for flow of the process gas working fluid 108. In another aspect of the exemplary embodiment, the process gas working fluid 108 and the cooling oil 110 are contained in separate compartments of the pressure equalizer 106, separated by at least one separator, for example, a bellow 134.

Continuing with another aspect of the exemplary embodiment, at least one spring means 136 acts on the at least one bellow 134 to add a spring force, in addition to the force exerted by the gas working fluid 108, to the cooling oil 110. It should be noted that the pressure of cooling oil 110 is maintained higher, typically slightly higher, than the pressure of the process gas working fluid 108. Accordingly, in the exemplary embodiment, if a leak develops in any barrier between the cooling oil 110 and the gas working fluid 108, the leak will be in the direction from the cooling oil 110 to the gas working fluid 108.

It has to be considered that acid/sour gas is likely to be present in natural gas reservoirs and that the apparatus according to the present invention is typically used for compressing such natural gas.

Since the process gas, e.g. the natural gas potentially containing high percentages of H2S and CO2, is used as coolant medium of the electric motor, there is a risk of corrosion of the electric motor windings and the electric motor laminations. For this reason the motor stator is encapsulated within a can filled with oil.

Anyway, if traces of acid/sour gas should be present in the oil the risk of corrosion would not be avoided by a simple can. For this reason, if the oil outside the can is at a pressure higher than the process gas inside the can, the process gas and any acid/sour gas contained therein can not enter the can even if there should be any contact between oil and gas due to e.g. cracks or holes in the can. Therefore, the oil serves both as a protection medium and a cooling medium.

As already said, the process gas 108 is used for cooling the electric motor rotor 126 inside the can 124 and the oil 110 is used for cooling the electric motor stator 128 outside the can 124. The gas flows all along the rotor compartment 128 and the can 124. The oil is pressurized by the pressure equalizer 106 and remains inside the stator compartment 126; in this way, i.e. without flow, it is easier to maintain a higher pressure, typically a slightly higher pressure, all along the can 124. Anyway, the oil flows by natural convection inside the stator compartment 126 and allows cooling of the electric motor stator.

It should be further noted that the pressure of the cooling oil 110 and the process gas working fluid 108 can be monitored. The equalization or drop of the pressure between these two fluids indicates that at least one of a plurality of barriers between the two fluids has failed and system maintenance is advisable.

Figure 2:
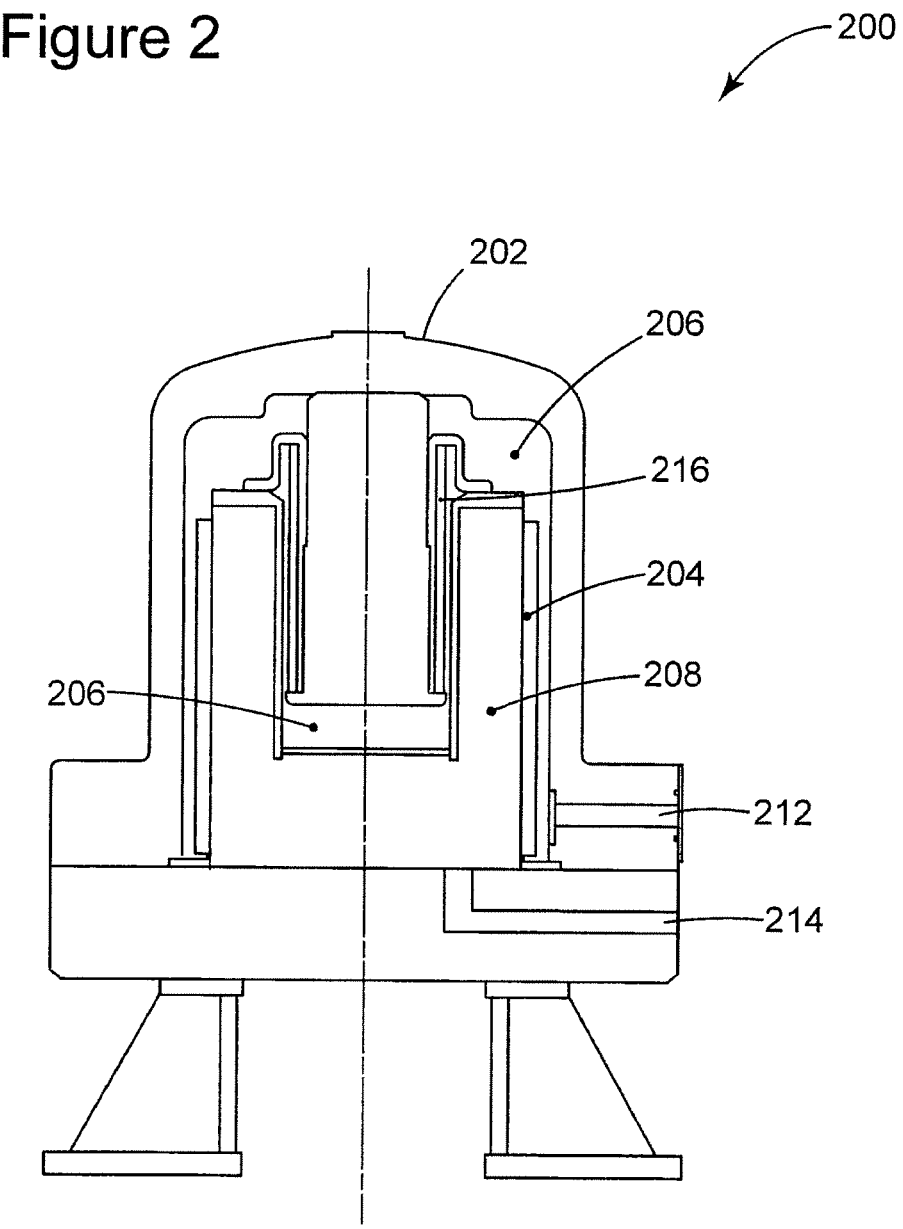
FIG. 2 depicts an enlarged, detailed, cross-section view of an embodiment of a pressure equalizer, detailing the bellows and spring assembly.

Looking now to FIG. 2, an exemplary embodiment is depicted of a detailed cross-section 200 of a pressure equalizer. The exemplary cross-section 200 represents an example of the pressure equalizer 106 from pressure equalizing system 100 (see FIG. 1). The exemplary embodiment cross-section 200 includes a casing 202, at least one bellow 204 connected such that they form two isolated chambers 206, 208. One chamber 208 of the exemplary embodiment contains the process gas working fluid and another chamber 206 contains the cooling oil.

In another aspect of the exemplary embodiment, a connection 212 allows the chamber containing the cooling oil to be connected to the motor compartment of an electric motor thus applying the motor compartment cooling oil pressure against one side of the bellow 204 in the pressure equalizer 200. In a further aspect of the exemplary embodiment, connection 214 allows the chamber containing the process gas working fluid to be connected to the rotor compartment of an electric motor thus applying the rotor compartment gas working fluid pressure against the other side of the bellow 204 in the pressure equalizer and creating the desired differential pressure between the two fluids.

Continuing with the exemplary embodiment, at least one spring means 216 is installed such that the force exerted by that spring means is directed to adding a compressive force to the cooling oil in addition to the force provided by the process gas working fluid pressure on the opposite side of the bellow 204. Accordingly, in the exemplary embodiment, the pressure of the cooling oil is greater than the pressure of the process gas working fluid and any leaks between the compartments containing cooling oil and the compartments containing process gas working fluid will result in leakage of the cooling oil into the process gas working fluid.

Figure 3:
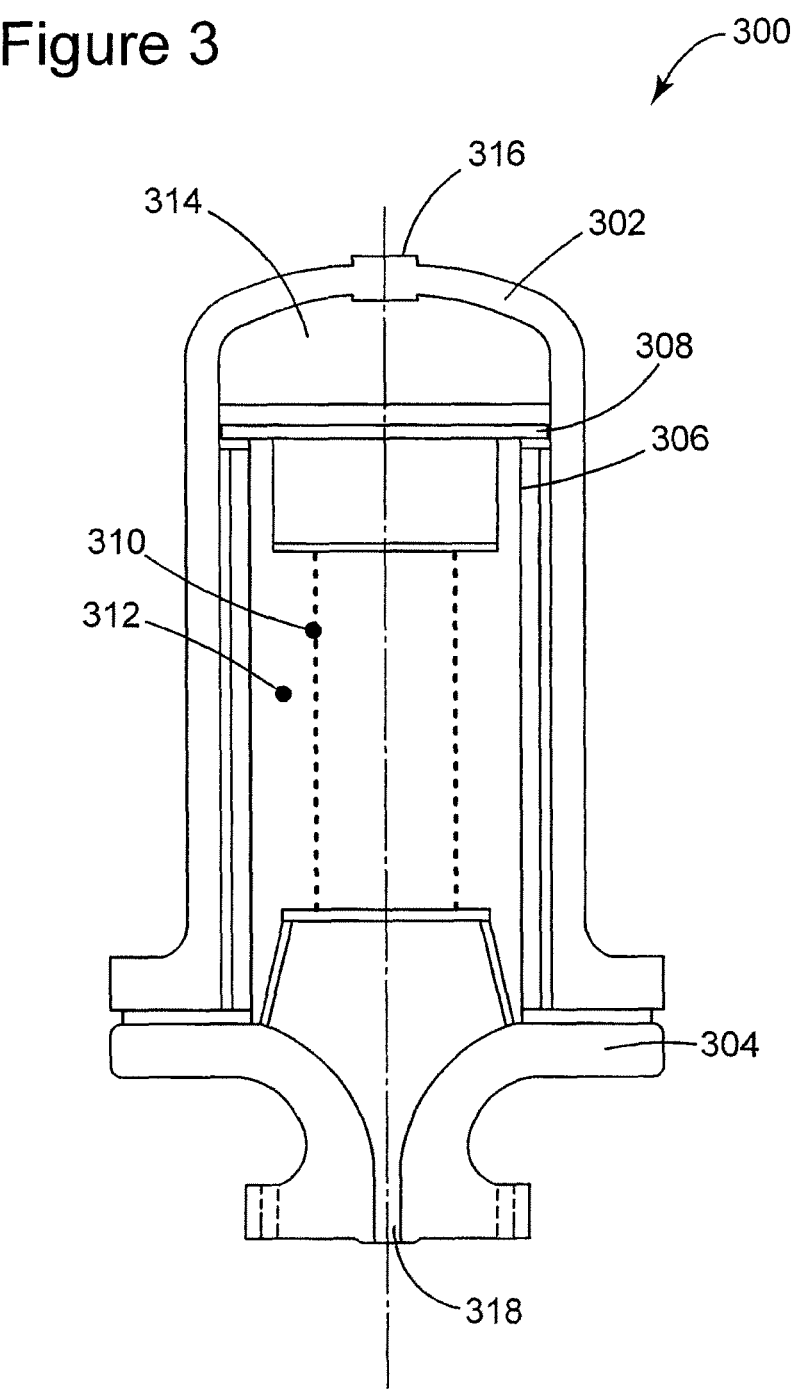
FIG. 3 depicts an enlarged, cross-section view of a second embodiment of a pressure equalizer, detailing the bellows and spring assembly.

Turning now to FIG. 3, another exemplary embodiment depicts a pressure equalizer 300 including a casing 302 attached to a mounting base 304, at least one bellow 306 attached to an internal plate 308 and a compression spring 310 inside the compartment 312 formed by the bellow and exerting a compressive force on the compartment 314, containing the cooling oil. It should be noted in the exemplary embodiment that the pressure of the cooling oil is maintained slightly higher than the pressure of the process gas working fluid based on the combined pressures of the process gas working fluid and the compressive force provided by the spring 310.

Continuing with the exemplary embodiment, the pressure equalizer 300 has a connection 316 for connecting the pressure equalizer 300 to the motor compartment of an electric motor and a connection 318 for connecting the pressure equalizer 300 to the rotor compartment of the motocompressor. It should be noted that the connection 316 allows cooling oil to flow from compartment 314 to the motor compartment of the motocompressor and connection 318 allows process gas working fluid to flow from compartment 312 of the pressure equalizer to the rotor compartment of the motocompressor. It should be noted in the exemplary embodiment that a measurement reflecting equal or reversed differential pressure between the gas working fluid and the cooling oil indicates a failure in the barrier between the process gas working fluid and the cooling oil.

Figure 4:
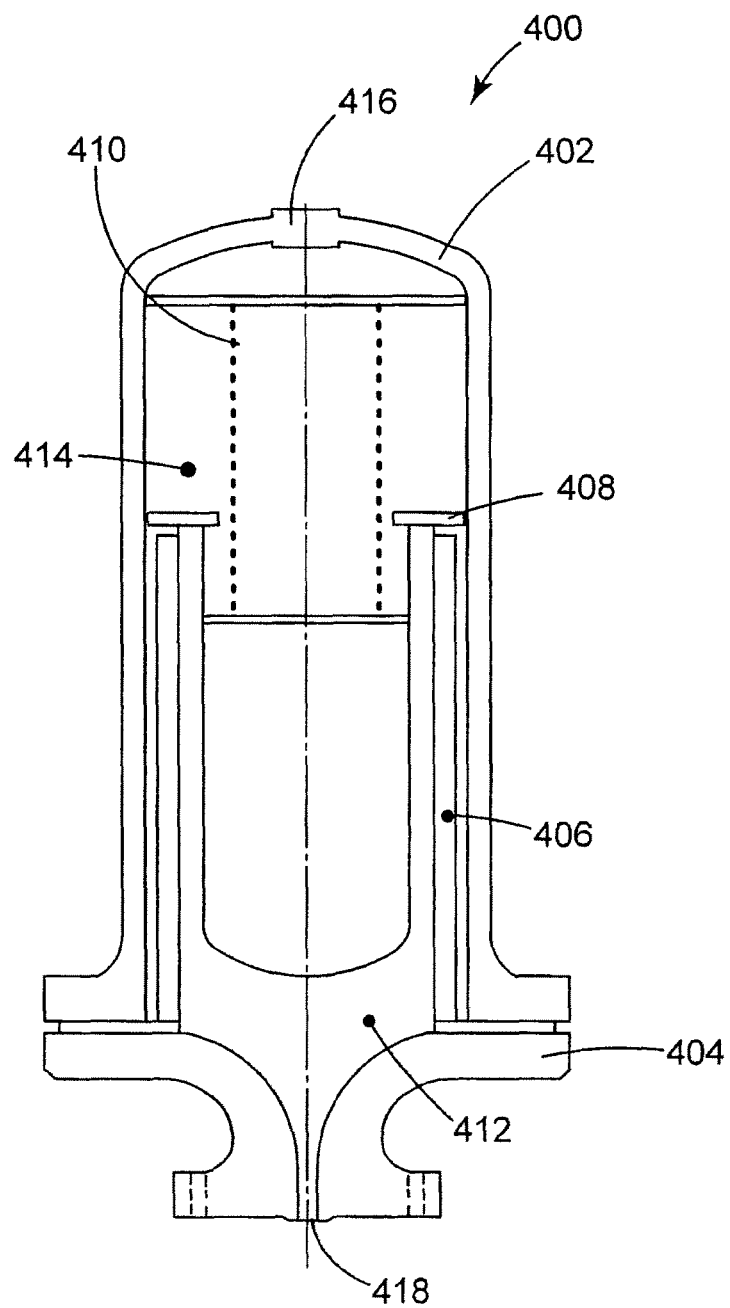
FIG. 4 depicts an enlarged, cross-section view of a third embodiment of a pressure equalizer, detailing the bellows and spring assembly.

Continuing now to FIG. 4, another exemplary embodiment of a pressure equalizer 400 is presented. The exemplary embodiment includes a casing 402 attached to a mounting base 404, at least one bellow 406 attached to an internal cylinder 408 and an expansion spring 410 inside compartment 414 and separate from the compartment 412, formed by the bellow 406, and exerting a compressive force on compartment 414, outside the bellow 406, containing the cooling oil. It should be noted in this exemplary embodiment that compartment 414 containing the spring 410 also contains the cooling oil. Continuing with the exemplary embodiment, the pressure equalizer 400 has a connection 418 for connecting to the rotor compartment of the electric motor, allowing the flow of the process gas working fluid between the rotor compartment and the pressure equalizer 400, and a connection 416, allowing the flow of cooling oil between the motor compartment and the pressure equalizer 400. In a further aspect of the exemplary embodiment, the pressure of the cooling oil is always greater than the pressure of the process gas working fluid because the force of the spring means 410 is added to the force of the process gas working fluid exerted on the bellows barrier between the gas working fluid and the cooling oil.

Figure 5:
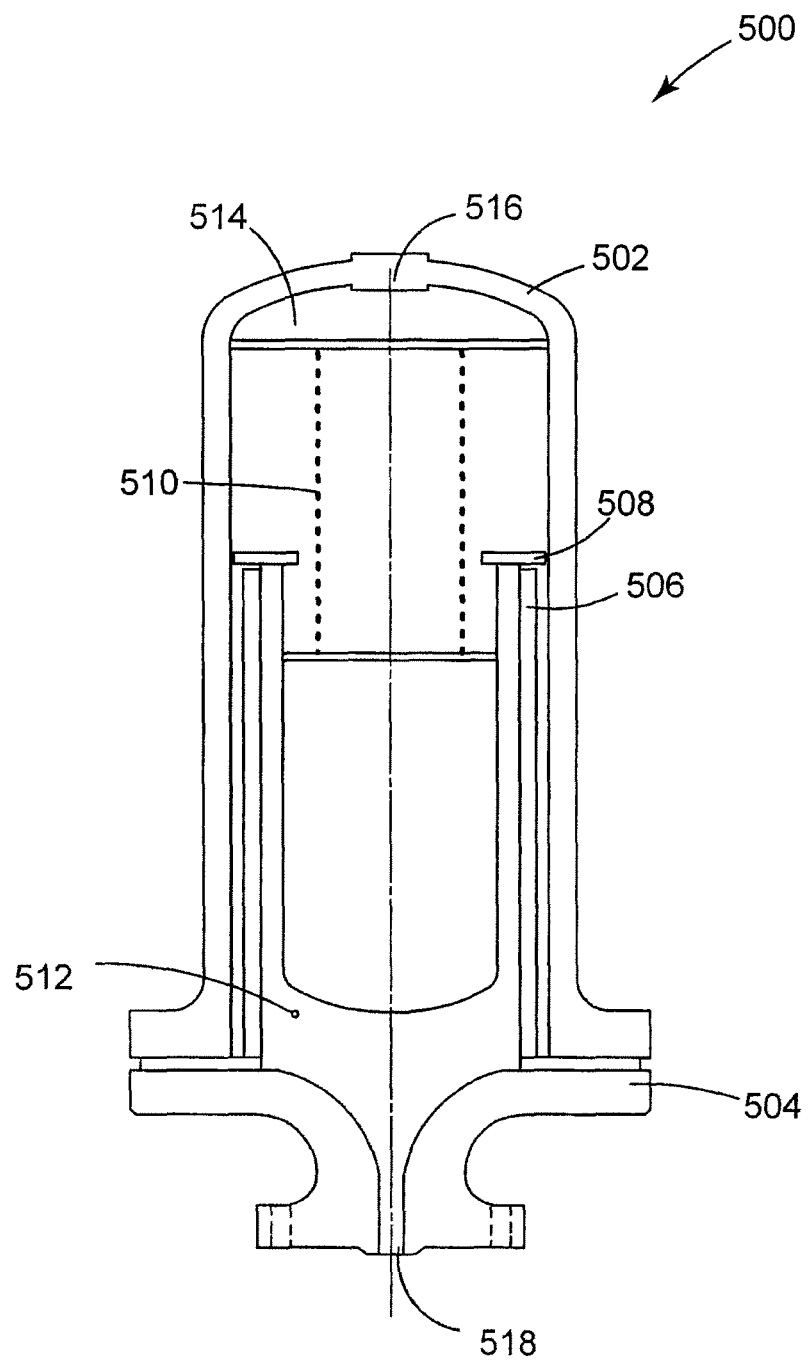
FIG. 5 depicts an enlarged, cross-section view of a fourth embodiment of a pressure equalizer, detailing the bellows and spring assembly.

Continuing now to FIG. 5, another exemplary embodiment of a pressure equalizer 500 is presented. The exemplary embodiment includes a casing 502 attached to a mounting base 504, at least one bellow 506 attached to a plate means 508 and a compression spring means 510 inside compartment 514 and separate from the compartment 512, formed by the bellow 506, and exerting a compressive force on compartment 512, inside the bellow 506, containing the cooling oil. It should be noted in the exemplary embodiment that compartment 514 containing the spring 510 also contains the process gas working fluid. Continuing with the exemplary embodiment, the pressure equalizer 500 has a connection 516 for connecting to the rotor compartment of the electric motor, allowing the flow of the gas working fluid between the rotor compartment and the pressure equalizer 500, and a connection 518, allowing the flow of cooling oil between the motor compartment and the pressure equalizer 500. In a further aspect of the exemplary embodiment, the pressure of the cooling oil is always greater than the pressure of the process gas working fluid because the force of the spring means 510 is added to the force of the process gas working fluid exerted on the bellows barrier between the process gas working fluid and the cooling oil.

Figure 6:
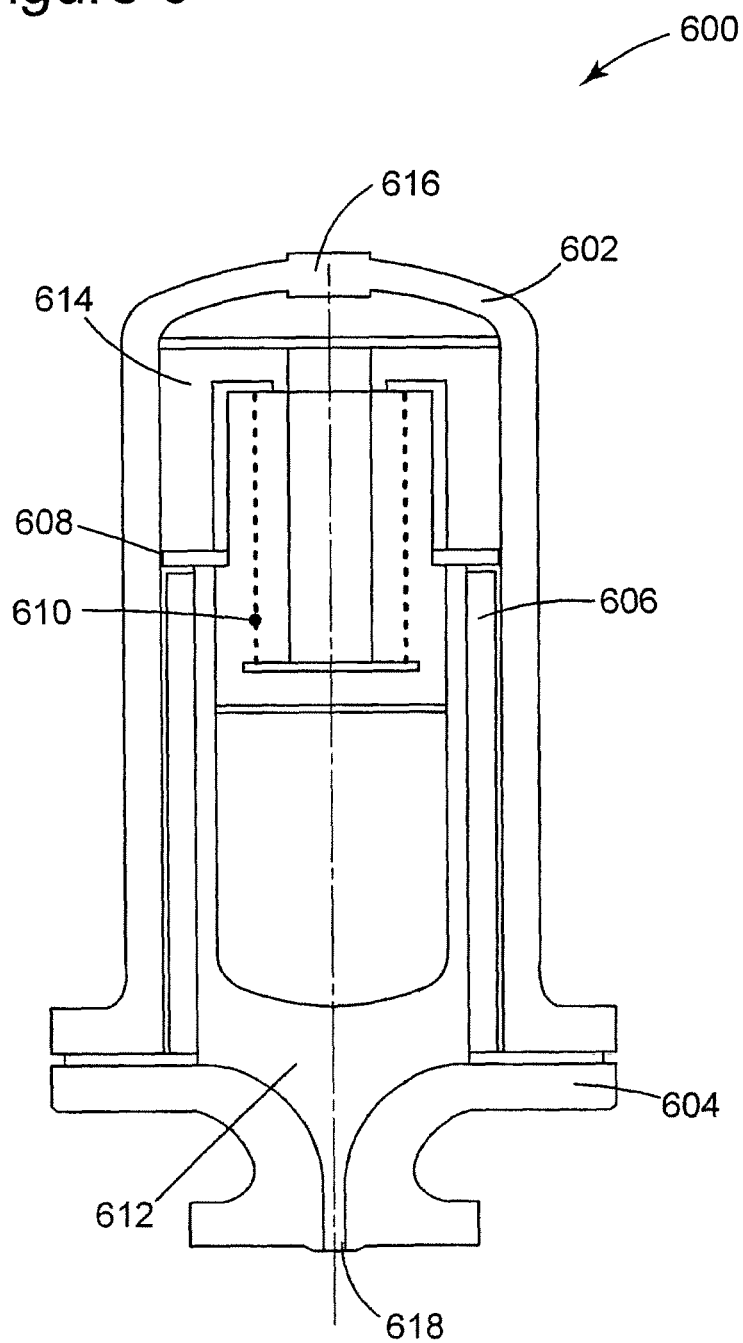
FIG. 6 depicts an enlarged, cross-section view of a fifth embodiment of a pressure equalizer, detailing the bellows and spring assembly.

Continuing now to FIG. 6, another exemplary embodiment of a pressure equalizer 600 is presented. The exemplary embodiment includes a casing 602 attached to a mounting base 604, at least one bellow 606 attached to a plate 608 and a compression spring 610 inside compartment 614 and separate from the compartment 612, formed by the bellow 606, and exerting a compressive force on compartment 614, outside the bellow 606, containing the cooling oil. It should be noted in the exemplary embodiment that compartment 614 containing the spring 610 also contains the cooling oil. Continuing with the exemplary embodiment, the pressure equalizer 600 has a connection 618 for connecting to the rotor compartment of the electric motor, allowing the flow of the process gas working fluid between the rotor compartment and the pressure equalizer 600, and a connection 616, allowing the flow of cooling oil between the motor compartment and the pressure equalizer 600. In a further aspect of the exemplary embodiment, the pressure of the cooling oil is always greater than the pressure of the process gas working fluid because the force of the spring 610 is added to the force of the process gas working fluid exerted on the bellows barrier between the process gas working fluid and the cooling oil.

Continuing now to FIG. 7, an exemplary method embodiment 700 for maintaining a desired differential pressure between cooling oil 110 associated with an electric motor 102 and a process gas working fluid 108 associated with a compressor 104 is depicted. It should be noted in the exemplary embodiment that the pressure of the cooling oil 110 is maintained slightly higher than the pressure of the process gas working fluid 108. Accordingly, any leaks in the barrier between the cooling oil 110 and the process gas working fluid 108 will result in cooling oil 110 flowing into the process gas working fluid 108.

Starting at exemplary method embodiment step 702, an electric motor 102 rotor 120 is axially connected to a compressor 104 rotor 130. It should also be noted in the exemplary embodiment that a can 124 axially surrounds the electric motor 102's rotor 120 and stator 122 and provides a barrier creating a rotor compartment 128 separate from a motor compartment 126. Continuing with the exemplary method embodiment, the cooling oil 110 is contained in the motor oil compartment 126, in contact with the outside walls of the can 124.

Next at exemplary method embodiment step 704, a portion of the process gas working fluid 108 from feed 116 for the compressor 104 is diverted 118 through the inside of the can 124, passing around the electric motor 102's rotor 120 and stator 122. It should be noted in the exemplary embodiment that the process gas working fluid 108 diverted through the electric motor 102's can 124 serves as a coolant for at least the electric motor's 102 rotor 120 and stator 122 rotor bearings. Next in the exemplary method embodiment, the diverted process gas working fluid 108 in line 118 can be returned to the feed line 116 for entry into the compressor 104 or can be separately sent to the compressor 104.

Next at exemplary method embodiment step 706, a pressure equalizer 106 is connected to the electric motor 102. It should be noted in the exemplary embodiment that the pressure equalizer 106 is connected with at least a line 112 allowing flow of the cooling oil between the motor oil compartment 126 of the electric motor 102 and at least one compartment of the pressure equalizer 106 and a line 114 allowing flow of the process gas working fluid between the rotor compartment 128 of the electric motor 102 and a second compartment of the pressure equalizer 106. In another aspect of the exemplary method embodiment, at least one bellow 134 is configured as a barrier between the two fluids 108, 110 in the pressure equalizer 106.

Continuing with another aspect of the exemplary method embodiment, at least one spring 216 is configured in the pressure equalizer 106 to provide a force, additive with the pressure force of the process gas working fluid 108, exerted on the cooling oil 110 and providing a slightly higher pressure for the cooling oil 110 than the process gas working fluid 108. It should be further noted in the exemplary method embodiment, that a failure of any barrier between the cooling oil 110 and the process gas working fluid 108 will result in a drop in the pressure differential between the cooling oil 110 and the process gas working fluid 108 and accordingly an indication of a barrier failure.

In another aspect of the exemplary embodiment, at least one pressure increasing device, for example, impeller means 132 is connected to the electric motor 102's rotor 120 provides an increased gas pressure to maintain a flow of process gas working fluid 108 through the can 124. It should be noted that the impeller can be connected to the end of the rotor 120. Another aspect of the exemplary method embodiment provides that the pressure of the cooling oil 110 is always slightly higher than the process gas working fluid 108 pressure.

The disclosed exemplary embodiments provide a system and a method for maintaining the pressure of the cooling oil slightly higher than the pressure of the process gas working fluid on the adjacent sides of the can in a canned electric motor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus, comprising:
   an electric motor comprising a can to separate a stator compartment from a rotor compartment, the stator compartment comprising a stator and cooling oil, and the rotor compartment comprising an electric motor rotor, rotor bearings, and a diverted process gas;
   a compressor comprising a rotor connected to the electric motor rotor wherein a part of the compressor's process gas is the diverted process gas diverted through the can of the electric motor; and
   a pressure equalizer comprising:
     at least one bellow hermetically connected to a housing in order to create a first reservoir of the cooling oil and a second reservoir of the process gas inside the housing and to prevent the mixing of the process gas with the cooling oil inside the housing;
     at least one compression spring inside the at least one bellow configured to provide compression on the first reservoir such that the cooling oil pressure in the first reservoir is greater than the process gas pressure in the second reservoir;
     a first connection arranged from the first reservoir to the electric motor stator compartment outside of the can of the electric motor and configured to apply the cooling oil pressure against one side of the at least one bellow in the pressure equalizer; and
     a second connection arranged from the second reservoir to the process gas inside of the can of the electric motor and configured to apply the process gas pressure against an opposite side of the at least one bellow in the pressure equalizer to produce a desired differential pressure between the cooling oil and the process gas,
   wherein the process gas cannot come into contact with the electric motor stator.

2. The apparatus of claim 1, wherein the apparatus detects a failure of the hermetically sealed bellow based on a drop in a differential pressure between the process gas and the cooling oil.

3. The apparatus of claim 1, wherein the process gas operates as a coolant for the electric motor rotor.

4. The apparatus of claim 1, wherein the cooling oil pressure is always greater than the process gas pressure.

5. The apparatus of claim 1, wherein the electric motor rotor comprises an impeller attached to an end of the electric motor rotor for boosting process gas pressure to a differential pressure with respect to the cooling oil.

6. The apparatus of claim 1, wherein the pressure equalizer is configured to maintain the electric motor stator compartment filled with cooling oil at a differential pressure.

7. The apparatus of claim 1, wherein the pressure equalizer is configured to operate as a cooling oil reservoir for the electric motor stator compartment of the electric motor.

8. The apparatus of claim 1, wherein the electric motor stator compartment is configured to establish a natural convection flow of the pressurized cooling oil inside the electric motor stator compartment.

9. The apparatus of claim 1, wherein the electric motor stator compartment is configured as a closed container only receiving pressurized cooling oil from the pressure equalizer.

10. The apparatus of claim 1, wherein the pressure equalizer is integrated internally.

\* \* \* \* \*